United States Patent
McGraw

(10) Patent No.: US 6,819,983 B1
(45) Date of Patent: Nov. 16, 2004

(54) SYNTHETIC PRESSURE ALTITUDE DETERMINING SYSTEM AND METHOD WITH WIND CORRECTION

(75) Inventor: Gary A. McGraw, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 22 days.

(21) Appl. No.: 10/308,422

(22) Filed: Dec. 3, 2002

(51) Int. Cl.$^7$ .............................................. G06F 17/00
(52) U.S. Cl. .............................. 701/4; 701/10; 701/14; 340/945; 340/977
(58) Field of Search ............................ 701/4, 7, 10, 14; 340/945, 949, 967, 968, 970, 973, 974, 977

(56) References Cited

U.S. PATENT DOCUMENTS

| | | | | |
|---|---|---|---|---|
| 4,086,810 | A | * 5/1978 | Ball ............................ | 73/179 |
| 4,170,132 | A | * 10/1979 | Serley ....................... | 73/178 T |
| 5,051,910 | A | * 9/1991 | Liden ......................... | 701/204 |
| 5,349,347 | A | * 9/1994 | Muller ....................... | 340/969 |
| 6,188,330 | B1 | * 2/2001 | Glover ....................... | 340/963 |
| 6,216,064 | B1 | * 4/2001 | Johnson et al. ............... | 701/4 |
| 6,266,583 | B1 | * 7/2001 | Tazartes et al. ............... | 701/4 |
| 6,462,703 | B2 | * 10/2002 | Hedrick ....................... | 342/120 |
| 6,640,165 | B1 | * 10/2003 | Hayward et al. .............. | 701/4 |
| 6,647,774 | B1 | * 11/2003 | Youngquist ............. | 73/170.02 |
| 2004/0024500 | A1 | * 2/2004 | Campbell .................... | 701/14 |

FOREIGN PATENT DOCUMENTS

WO    WO 02/088632    *   7/2002

OTHER PUBLICATIONS

"A Gradient Wind Error Model For The Blanchard Algorithm", by K. Hayward and L. Stephenson, Northrop Grumman, Integrated Systems. 2002, IEEE, pp. 254–262. (month not available).

"A New Algorithm For Computing Inertial Altitude And Vertical Velocity", by R. Blanchard. IEEE Transactions on Aerospace and Electronics Systems, vol. AES–7, No. 6, Nov. 1971.

"Pressure And Blanchard Altitudes Computed From Atmospheric Data Gathered From May Through Jul. 2000 at White Sands, New Mexico", by T. Li and D. Thunborg, Northrop Grumman, Guidance and Control Systems. ION 57$^{th}$ Annual Meeting/CIGTF 20$^{th}$ Biennial Guidance Test Symposium, Jun. 2001, Albuquerque, NM, pp. 325–333.

"An Improvement To An Algorithm For Computing Aircraft Reference Altitude", by R. Blanchard. IEEE Transactions on Aerospace and Electronics Systems, Sep. 1972.

Co–pending U.S. patent application Docket No. 02CR327/KE "Synthetic Pressure Altitude Determining System And Method" by Gary A. McGraw and Douglas A. Bell which is being filed on the same day herewith.

Co–pending U.S. patent application Docket No. 03CR072/KE "Synthetic Pressure Altitude Determining System And Method With Wind Correction Using Integrity Monitoring From A Pressure Sensor" by Patrick Y. Hwang and Gary A. McGraw which is being filed on the same day herewith.

* cited by examiner

Primary Examiner—Tan Q. Nguyen
(74) Attorney, Agent, or Firm—Nathan O. Jensen; Kyle Eppele

(57) ABSTRACT

A method of generating a synthetic pressure altitude is disclosed. The method includes providing a static air temperature to a data processing device. The method also includes providing a wind velocity, a ground velocity, and a geometric altitude to the data processing device. Further, the method includes performing a numerical integration based on the static air temperature, the wind velocity, the ground velocity, and the geometric altitude. The wind velocity and the ground velocity are used to estimate pressure gradients not included in a static air column model.

30 Claims, 1 Drawing Sheet

SYNTHETIC PRESSURE ALTITUDE DETERMINING SYSTEM AND METHOD WITH WIND CORRECTION

CROSS-REFERENCE TO RELATED PATENT APPLICATIONS

This application relates to U.S. patent application No. 02CR327/KE, entitled Synthetic Pressure Altitude Determining System and Method, and U.S. patent application No. 03CR072/KE, entitled Synthetic Pressure Altitude Determining System and Method Using Integrity Monitoring From A Pressure Sensor, each of which is filed on the same day herewith.

BACKGROUND

Reduced Vertical Separation Minima (RVSM) requirements dictate substantial improvements in air-data systems and aircraft installation and maintenance. RVSM airspace is any airspace or route between 29,000 ft and 41,000 ft inclusive where aircraft are separated vertically by 1,000 ft (300 m). RVSM decreases the minimum vertical separation from 2000 ft and is being implemented world-wide on a region-by-region basis. Conventionally, minimum vertical separation requirements were 2000 ft and pressure altitude monitoring equipment, which directly measured the pressure outside the aircraft, was used to determine the pressure altitude and provided a proper tolerance to comply with the 2000 ft minimum separation requirement.

With the implementation of RVSM, older pressure altitude measuring equipment and installations may not have sufficient accuracy or reliability to meet RSVM requirements.

RVSM altitude monitoring requirements lead to increased cost for upgrading or replacing conventional air-data equipment and aircraft installations and maintenance. Accordingly, there is a need for a pressure altitude monitoring system that meets RSVM requirements without costly aircraft modifications and testing. Further, there is a need for an algorithm that uses geometric altitude, temperature, and relative wind speed measurements to correct errors in pressure altitude measurements. Further, there is a need for a GPS altitude, temperature, and relative wind speed based synthetic pressure computation system which provides a synthetic pressure altitude and meets the RVSM requirements. Further, there is a need for the use of a geometric altitude that is suitably compensated with temperature and wind measurements, to produce a synthetic pressure altitude measurement. There is also a need for a GPS based synthetic pressure computation system that may be used as an independent monitor in a dual RVSM air data system to help determine whether an RVSM air-data system is in error.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of generating a synthetic pressure altitude. The method includes providing a static air temperature to a data processing device, providing a wind velocity to the data processing device, providing a ground velocity to the data processing device, and providing a geometric altitude to the data processing device. The method also includes performing a numerical integration based on the static air temperature, the wind velocity, the ground velocity, and the geometric altitude. The wind velocity and ground velocity are used to compensate for pressure gradients.

Another example of the invention relates to a method of determining the pressure altitude of an aircraft. The method includes providing a static air temperature from a temperature sensor on the aircraft, to a data processing device. The method also includes providing a geometric altitude from a position determining system on the aircraft, to the data processing device. Further, the method includes providing a wind velocity, from a flight management system or other source, to the data processing device. Further still, the method includes providing a ground velocity, from a flight management system or other source on the aircraft, to the data processing device. Yet further still, the method includes performing a numerical integration based on the static air temperature and the geometric altitude.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
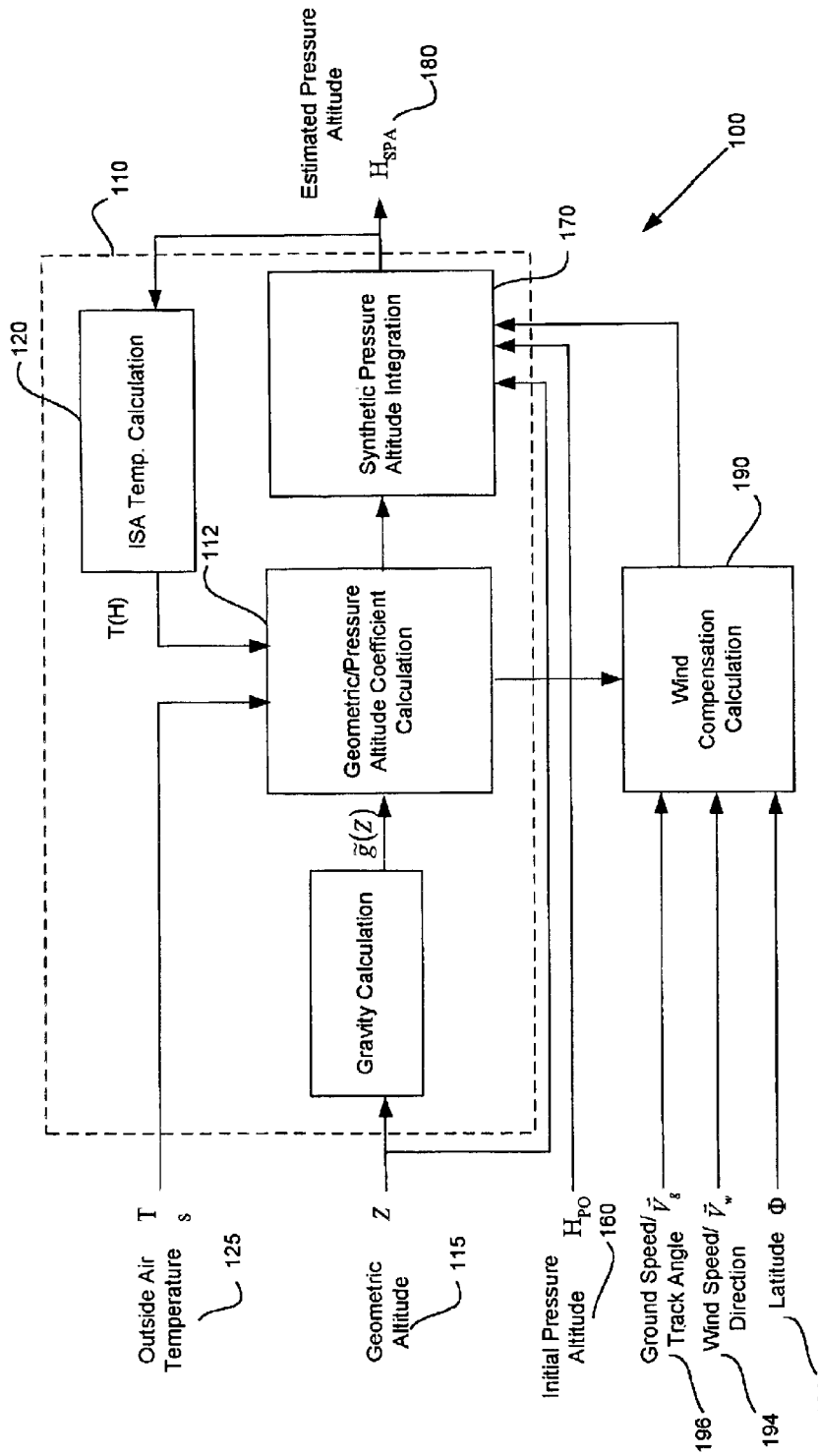
FIG. 1 is a block diagram of a synthetic pressure altitude computation system that includes wind compensation.

Before describing, in detail the particular improved system and method, it should be observed that the invention includes, but is not limited to a novel structural combination of conventional data/signal processing components and measurement circuits, and not in the particular detailed configurations thereof. Accordingly, the structure, methods, functions, control and arrangement of conventional components and circuits have, for the most part, been illustrated in the drawings by readily understandable block representations, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Various RVSM altimetry system error (ASE) requirements from FAA guidance materials may be used to come up with statistical requirements to apply to the use of synthetic pressure altitude. For example, For Group Aircraft
   Basic RVSM Envelope requirements considering all sources of ASE are:
      The largest absolute value of the mean ASE should not exceed 80 ft (25 m)
      The largest absolute value of the mean plus three sigma ASE should not exceed 200 ft (60 m)
   The Full RVSM Envelope requirements are:
      The largest absolute value of the mean ASE should not exceed 120 ft (37 m)
      The largest absolute value of the mean plus three sigma ASE should not exceed 245 ft (75 m)
   Individual aircraft in a group should have ASE contained in ±200 ft (±60 m).
For Non-Group aircraft
   Basic RVSM Envelope requirement is:
      |Residual static source error+worst case avionics|<160 ft (50 m)

For Full Envelope:

|Residual static source error+worst case avionics|<200 ft (60 m)

Further, the integrity requirement provided in FAA guidance materials includes that the altimetry system failure should be less than $10^{-5}$ per hour. Also, altitude alerts should occur for ±200 ft (±60 m). Overall equipment tolerance in implementing these nominal threshold values should not exceed ±50 ft (±15 m).

To derive a basic model relating geometric and pressure altitudes, a static column of air is assumed.

Pressure altitude is a measurement of geopotential altitude which may be related to geometric altitude by $$G_0 dH = g(Z) dZ \tag{1}$$

where

Z=geometric altitude referenced to Mean Sea Level

H=geopotential altitude $G_0$=standard acceleration due to gravity=9.80665 m/s² g(Z)=acceleration due to gravity at altitude Z.

A model for gravity in terms of latitude λ and altitude Z may be given as:

$$g = g_0(1 + g_1 \sin^2 \lambda + g_2 Z) \tag{2}$$

$g_0$=9.7803 m/s²

$g_1$=0.005296

$g_2$=−9.6229×10⁻⁸ m⁻¹.

Integrating (1) using (2) yields an estimate for geopotential altitude:

$$\int_0^H dH = \int_0^Z \frac{g(Z)}{g_0} dZ \tag{3}$$

$$\hat{H}_{GEO} = (g_0/G_0)\left(1 + g_1 \sin^2\lambda + \frac{1}{2} g_2 Z\right) Z.$$

The basic relationship for modeling the static atmosphere is $$\frac{dP}{P} = -\frac{Mg}{RT} dZ \tag{4}$$

where

P=atmospheric pressure

T=absolute temperature, K

M=mean molecular weight=28.9644 kg/kmol

R=universal gas constant=8314.32 J/kmol*K.

Because equation (4) is based on a static column of air, it does not fully account for pressure and temperature that occur with horizontal motion or with changes in weather.

In the international standard atmosphere (ISA) model, geopotential or pressure altitude replaces geometric altitude in (4):

$$\frac{dP}{P} = -\frac{MG_0}{RT(H)} dH. \tag{5}$$

In this model a constant value for gravity is used along with a specific temperature profile, the so-called standard day:

$$T(H) = T_b + LH = \begin{cases} T_0 - 6.5H, & 0 \leq H \leq H_1 \\ T_1, & H_1 < H \leq H_2 \end{cases} \tag{6}$$

where $H_1$=11 km $H_2$=20 km $T_0$=288.15 K $T_1$=216.65 K.

Equations (4) and (5) give two expressions for the incremental change in pressure as a function of changes in geometric and geopotential altitude, respectively. Pressure altitude may be estimated by relating incremental changes in pressure altitude to changes in geometric altitude:

$$\frac{g(Z)}{T(Z)} dZ = \frac{G_0}{T(H)} dH \tag{7}$$

which explicitly shows the dependence of temperature on geometric or geopotential altitude. Using (6), the right hand side of (7) can be integrated easily analytically, but the left hand side may be integrated numerically. Defining $\tilde{g}(Z) = g(Z)/G_0$, we have for $0 \leq H < H_1$:

$$\int_{Z_{n-1}}^{Z_n} \frac{\tilde{g}(Z)}{T(Z)} dZ = \int_{H_{n-1}}^{H_n} \frac{1}{T_0 + LH} dH \tag{8}$$

$$\int_{Z_{n-1}}^{Z_n} \frac{\tilde{g}(Z)}{T(Z)} dZ = \frac{1}{L} \ln(T_0 + LH) \Big|_{H_{n-1}}^{H_n}$$

$$\ln\left(\frac{T_0 + LH_n}{T_0 + LH_{n-1}}\right) = L \int_{Z_{n-1}}^{Z_n} \frac{\tilde{g}(Z)}{T(Z)} dZ$$

$$H_n = \exp\left\{L \int_{Z_{n-1}}^{Z_n} \frac{\tilde{g}(Z)}{T(Z)} dZ\right\}[T_0/L + H_{n-1} - T_0/L]$$

$$H_n = (1 + c_n) H_{n-1} + c_n \frac{T_0}{L}$$

$$c_n = \exp\left\{L \int_{Z_{n-1}}^{Z_n} \frac{\tilde{g}(Z)}{T(Z)} dZ\right\} - 1$$

For $H_1 < H < H_2$, $T(H) = T_1$, and (7) integrates as $$\int_{Z_{n-1}}^{Z_n} \frac{\tilde{g}(Z)}{T(Z)} dZ = \int_{H_{n-1}}^{H_n} \frac{1}{T_1} dH = \frac{1}{T_1}(H_n - H_{n-1}) \tag{9}$$

$$H_n = H_{n-1} + d_n$$

$$d_n = T_1 \int_{Z_{n-1}}^{Z_n} \frac{\tilde{g}(Z)}{T(Z)} dZ$$

The integrals in (8) and (9) can be evaluated via the trapezoidal rule:

$$c_n = \exp\left\{\frac{L}{2}\left(\frac{\tilde{g}_n}{T_n} + \frac{\tilde{g}_{n-1}}{T_{n-1}}\right)(Z_n - Z_{n-1})\right\} - 1, \quad 0 \leq H \leq H_1 \tag{10}$$

$$d_n = \frac{T_1}{2}\left(\frac{\tilde{g}_n}{T_n} + \frac{\tilde{g}_{n-1}}{T_{n-1}}\right)(Z_n - Z_{n-1}), \quad H_1 < H \leq H_2$$

The initial condition, $\hat{H}_p(0)$, for the state propagation in (8) can be set either by the known surface pressure at departure from the airport or from a pressure altimeter—which are generally very accurate at low altitudes. Summarizing, the following is the resultant iteration for the synthetic pressure estimate:

$$\hat{H}_p(n) = \begin{cases} (1+c_n)\hat{H}_p(n-1) + c_n \frac{T_0}{L}, & 0 \le \hat{H}_p \le H_1 \\ \hat{H}_p(n-1) + d_n, & H_1 < \hat{H}_p < H_2 \end{cases} \quad (11)$$

In an exemplary embodiment, a synthetic pressure altitude estimation may be derived that incorporates wind and aircraft ground speed data which may not be compensated or captured by a static air column model. The incorporation of wind and aircraft ground speed results in the removal of some errors which may result from the use of a static air column model. Pressure altitude is derived by using estimates of geometric altitude along with corrections for wind data and temperature data. For example, consider a parcel of air whose location in a local-level (LL) coordinate frame is given by $r^L$ (derived using an East, North, Up coordinate frame). The wind velocity may be denoted as $v_w = \dot{r}^L$. The acceleration of the parcel of air may be given by the Coriolis Theorem:

$$\dot{v}_w = a_{ext}^L - 2\omega_{LI}^L \times V_w - \omega_{LI}^L \times \omega_{LI}^L \times r^L \quad (12)$$

where:
$a_{ext}^L$=Sum of external forces per unit mass in LL frame.
$\omega_{LI}^L$=Angular rate of the LL frame with respect to inertial in LL frame coordinates.

At high altitudes, the external forces acting on the air mass are gravity and pressure gradients. With the air density denoted as $\rho$ and normal gravity as $g_n$:

$$a_{eu}^L = g_n - \frac{1}{\rho}\nabla P. \quad (13)$$

Plumb-bob gravity may be defined as $g = g_n - \omega_{LI}^L \times \omega_{LI}^L \times r^L$, so combining (12) and (13) yields $$\dot{v}_w = g - 2\omega_{LI}^L \times v_w - \frac{1}{\rho}\nabla P. \quad (14)$$

In steady state conditions ($\dot{v}_w = 0$), equation (14) can be used to show that the winds are along pressure isobars. Furthermore, there is a global pressure gradient from the equator to the poles that gives rise to the so-called "geostropic winds"—the west-to-east jet stream.

A vehicle flying through the air mass, may have ground velocity $v_g$ represented as:

$$v_g = \begin{bmatrix} V_{gE} \\ V_{gN} \\ \dot{Z} \end{bmatrix}.$$

The pressure change measured over time may be given by the total time derivative of pressure, P:

$$\frac{dP}{dt} = \nabla P \cdot v_g + \frac{\partial P}{\partial t} \quad (15)$$

assuming that the second term in (15) is small, since this is due to changes in weather conditions at a given location.

Computing the dot product of (14) with $v_g$ and using (15) yields $$\dot{v}_w \cdot v_g = g \cdot v_g - 2(\omega_{LI}^L \times v_w) \cdot v_g - \frac{1}{\rho}\frac{dP}{dt} \quad (16)$$

The angular rate of the LL frame is composed of two components, the earth rotation rate and the transport rate due to the vehicle motion:

$$\omega_{LI}^L = \begin{bmatrix} -V_{gN}/R \\ V_{gE}/R + \Omega_e \cos\phi \\ \Omega_e \sin\phi \end{bmatrix}$$

where $R = R_e + Z$, $\phi$ is latitude, and $\Omega_e$ is the earth rotation rate. The vertical components of the wind velocity and acceleration are assumed to be zero, so $$v_w \begin{bmatrix} V_{wE} \\ V_{wN} \\ 0 \end{bmatrix}, \dot{v}_w = \begin{bmatrix} \dot{V}_{wE} \\ \dot{V}_{wN} \\ 0 \end{bmatrix}.$$

Furthermore, the horizontal components of gravity may be ignored, so $g = [0\ 0\ -G]^T$. With these assumptions and definitions, and using the identity $(a \times b) \cdot c = (b \times c) \cdot a$, equation (16) becomes $$\frac{1}{\rho}\frac{dP}{dt} = \left[ -G + \frac{2V_{gN}V_{wN}}{R} + \frac{2V_{gE}V_{wE}}{R} + 2\Omega_e V_{wE}\cos\phi \right]\dot{Z} - \quad (17)$$
$$[V_{gE}\dot{V}_{wE} + V_{gN}\dot{V}_{wN}] - 2[V_{gN}V_{wE} - V_{gE}V_{wN}]\Omega_e \sin\phi$$
$$\approx -G\dot{Z} - \dot{V}_{wa}V_g + 2V_{wc}V_g \Omega_e \sin\phi$$

In (17) the terms multiplying $\dot{Z}$ that are small, compared to gravitational acceleration, are neglected and the following definitions may be used:

$V_{wc}V_g = V_{gE}V_{wN} - V_{gN}V_{wE}$=Cross Wind Speed×Ground Speed $\dot{V}_{wG}V_g = V_{gE}\dot{V}_{wE} + V_{gN}\dot{V}_{wN}$=Along Track Wind Accel×Ground Speed (18)

The along track wind acceleration can be estimated from wind velocity by a Kalman filter.

For an ideal gas, $1/\rho = RT/MP$, which used in (17) gives an expression for the relative change in pressure as a function of the change in geometric altitude and the winds:

$$\frac{dP}{P} = -\frac{Mg(Z)}{RT(Z)}dZ + \frac{M}{RT(Z)}\left[2V_{wc}V_g \Omega_e \sin\phi - \dot{V}_{wa}V_g\right]dt. \quad (19)$$

The incremental pressure change can be related to change in geopotential altitude as $$\frac{dP}{P} = -\frac{MG_0}{RT(H)}dH \quad (20)$$

Equating (19) and (20) yields $$\frac{dH}{T(H)} = \frac{\tilde{g}(Z)}{T(Z)}dZ - \frac{1}{G_0 T(Z)}\left[2V_{wc}V_g \Omega_e \sin\phi - \dot{V}_{wa}V_g\right]dt \quad (21)$$

This is the basic differential relationship that we use to combine GPS, temperature, and wind data to estimate pressure altitude. The left hand side of (21) involving pressure altitude can be integrated analytically, whereas the right hand side must be integrated numerically. Two forms of wind compensation may be used. For example, using only the cross wind terms in (21) or both the cross and along track terms:

$$F_n = \begin{cases} -2V_{wc}(t_n)V_g(t_n)\Omega_e \sin\phi(t_n), & \text{Cross-Wind Only} \\ -2V_{wc}(t_n)V_g(t_n)\Omega_e \sin\phi(t_n) + \dot{V}_{wa}(t_n)V_g(t_n), & \text{Both Terms} \end{cases} \quad (22)$$

The derivation for the wind correction (22) assumed atmospheric conditions that may not apply near the ground, therefore it may be desirable to include logic in the integration of equation (21) that computes the wind compensation at altitudes greater than some threshold, $H_w$, where a range of values for $H_w$ may be, in an exemplary embodiment, 5,000 to 25,000 feet. The synthetic pressure estimation algorithm with wind corrections can be summarized as follows.

$$\hat{H}_p(n) = \begin{cases} (1 + c_n)\hat{H}_p(n-1) + c_n \frac{T_0}{L}, & 0 \le \hat{H}_p \le H_1 \\ \hat{H}_p(n-1) + d_n, & H_1 < \hat{H}_p < H_2 \end{cases} \quad (23)$$

$$c_n = \exp\left\{\frac{L}{2}\left(\frac{\tilde{g}_n}{T_n} + \frac{\tilde{g}_{n-1}}{T_{n-1}}\right)(Z_n - Z_{n-1})\right\} - 1, \qquad 0 \le H \le H_w \quad (24)$$

$$c_n = \exp\left\{\frac{L}{2}\left(\frac{\tilde{g}_n}{T_n} + \frac{\tilde{g}_{n-1}}{T_{n-1}}\right)(Z_n - Z_{n-1}) + \frac{L}{2}\left(\frac{F_n}{T_n} + \frac{F_{n-1}}{T_{n-1}}\right)(t_n - t_{n-1})\right\} - 1, \quad H_w \le H \le H_1$$

$$d_n = \frac{T_1}{2}\left\{\left(\frac{\tilde{g}_n}{T_n} + \frac{\tilde{g}_{n-1}}{T_{n-1}}\right)(Z_n - Z_{n-1}) + \frac{L}{2}\left(\frac{F_n}{T_n} + \frac{F_{n-1}}{T_{n-1}}\right)(t_n - t_{n-1})\right\}, \qquad H_1 \le H \le H_2$$

Referring now to FIG. 1, a block diagram of a system 100 for generating synthetic pressure altitude and for providing a corrected pressure altitude as an output of system 100, is depicted. System 100 includes a data processing device which may be used to carry out the operation of synthetic computation in block 110. The synthetic pressure computation algorithm receives a geographic height estimate Z from a geometric altitude system 115 which may include but is not limited to a GPS receiver. In other embodiments, either a single GPS unit may be used or more than two GPS receiver units may be used. Further, in alternative embodiments, other geometric height estimators or monitors may be used, including, but not limited to, inertial navigation systems (INS), radar systems, radio altimeters, etc. A static air temperature sensor 125 sends an approximation of static air temperature ($T_S$) to a geometric/pressure altitude coefficient calculator 112. An ISA air temperature model calculation 120 provides a temperature estimate (T(H)) to coefficient calculator 112. The coefficient calculator 112 utilizes equation (10) to determine the coefficients provided to synthetic pressure altitude integrator 170. Further, a pressure altitude monitor 160 provides an estimate of the initial pressure altitude $H_{P0}$ to a synthetic pressure altitude integrator 170. Initial pressure altitude $H_{P0}$ is used for providing initial conditions for the numerical integration. Synthetic pressure computation altitude integrator 170 may utilize equations (23) and (24) for providing the numerical and analytical integration which results in the generation of a synthetic pressure altitude $H_{SPA}$ 180. Equations (23) and (24) incorporate wind speed compensation calculations 190. Wind speed compensation calculator 190 receives measurements of latitude Φ 192, wind speed/direction $\vec{V}_w$ 194 and ground speed/track angle $\vec{V}_g$ 196. Also, wind compensation calculator 190 receives the geometric/pressure altitude coefficient calculations from calculator 112. The resultant wind compensation calculation is provided to integrator 170.

In a particular exemplary embodiment, use of the wind speed measurements may not be necessitated if the error requirements are not significant. Otherwise, ground speed and wind speed are used to improve the pressure altitude estimates.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the exact algorithmic formulations used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of generating a synthetic pressure altitude, comprising:
    providing a static air temperature to a data processing device;
    providing a wind velocity to the data processing device;
    providing a ground velocity to the data processing device;
    providing a geometric altitude to the data processing device; and
    performing a numerical integration based on the static air temperature, the wind velocity, the ground velocity, and the geometric altitude, the wind velocity and ground velocity used to cancel errors of a static air column model.

2. The method of claim 1, further comprising:
    providing an aircraft latitude to the data processing device.

3. The method of claim 1, further comprising:
    estimating the wind acceleration using an estimation filter.

4. The method of claim 3, wherein the estimation filter comprises a Kalman filter.

5. The method of claim 4, wherein the Kalman filter is a linear Kalman filter.

6. The method of claim 1, wherein the geometric altitude is generated from a global positioning system (CPS) signal.

7. The method of claim 1, wherein the geometric altitude is generated from an inertial navigation system.

8. The method of claim 1, wherein the wind velocity comprises a cross wind component.

9. The method of claim 1, wherein the wind velocity comprises an along track wind component.

10. The method of claim 1, further comprising:
smoothing the wind velocity data.

11. A method of determining the pressure altitude of an aircraft, comprising:
providing a static air temperature, from a temperature sensor on the aircraft, to a data processing device;
providing a wind velocity, from a flight management system on the aircraft, to the data processing device;
providing a ground velocity, from a flight management system on the aircraft, to the data processing device;
providing a geometric altitude, from a position determining system on the aircraft, to the data processing device; and
performing a numerical integration based on the static air temperature, the wind velocity, the ground velocity, and the geometric altitude, the wind velocity and ground velocity used to cancel errors of a static air column model.

12. The method of claim 11, further comprising:
providing a measured pressure altitude to the data processing device; and
correcting the measured pressure altitude using the output of the numerical integration.

13. The method of claim 11, further comprising:
estimating the wind acceleration using an estimation filter.

14. The method of claim 13, wherein the estimation filter comprises a Kalman filter.

15. The method of claim 14, wherein the Kalman filter is a linear Kalman filter.

16. The method of claim 11, wherein the geometric altitude is generated from a global positioning system (GPS) signal.

17. The method of claim 11, wherein the geometric altitude signal is generated from an inertial navigation system.

18. The method of claim 11, wherein the wind velocity comprises a cross wind component.

19. The method of claim 11, wherein the wind velocity comprises an along track wind component.

20. The method of claim 11, further comprising:
smoothing the wind velocity data.

21. A pressure altitude determining system, comprising:
a data processing device,
an air temperature monitor communicating air temperature data to the data processing device;
a wind velocity monitor communicating wind velocity data to the data processing device;
a ground velocity monitor communicating ground velocity data to the data processing device; and
a geometric altitude monitor communicating geometric altitude data to the data processing device,
wherein the data processing device carries out a numerical integration based on the air temperature data, the wind velocity data, the ground velocity data, and the geometric altitude data, to generate a synthetic pressure altitude.

22. The system of claim 21, further comprising:
an aircraft latitude monitor communicating aircraft latitude data to the data processing device.

23. The system of claim 21, further comprising:
a wind acceleration generator that generates a wind acceleration using a state estimator.

24. The system of claim 23, wherein the estimation filter comprises a Kalman filter.

25. The system of claim 24, wherein the Kalman filter is a linear Kalman filter.

26. The system of claim 21, wherein the geometric altitude is generated from a global positioning system (GPS) signal.

27. The system of claim 21, wherein the geometric altitude signal is generated from an inertial navigation system.

28. The system of claim 21, wherein the wind velocity comprises a cross wind component.

29. The system of claim 21, wherein the wind velocity comprises an along track wind component.

30. The system of claim 21, further comprising:
wind velocity data smoothing algorithm.

* * * * *